Sept. 11, 1945.   D. H. STEWART   2,384,655
TWO-FILM CAMERA
Filed Jan. 26, 1944
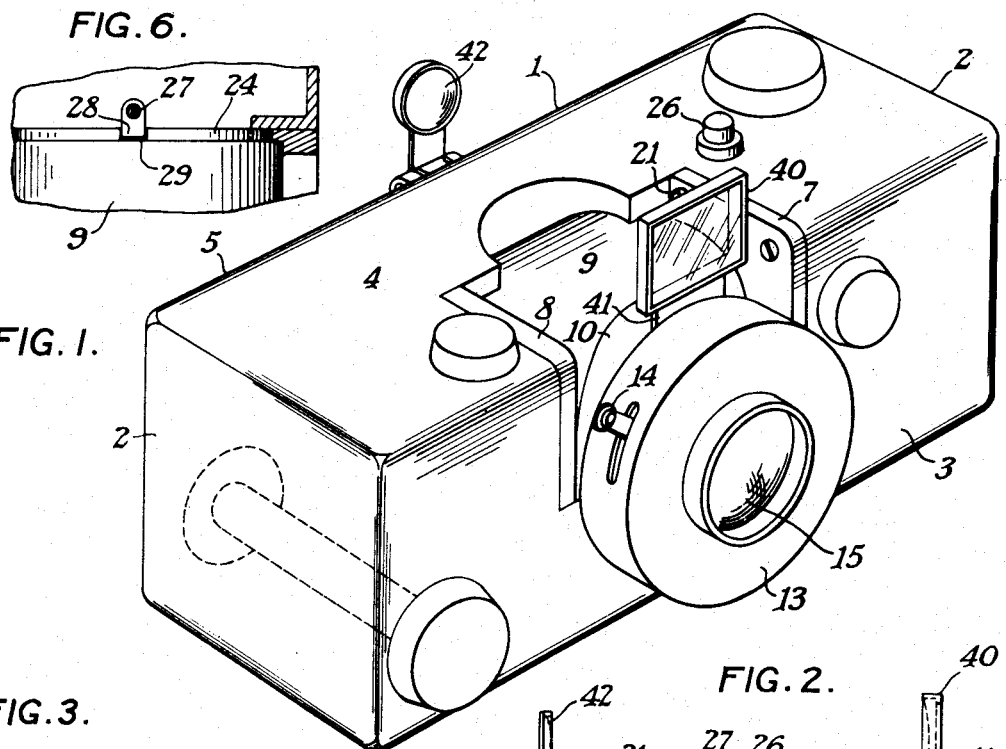
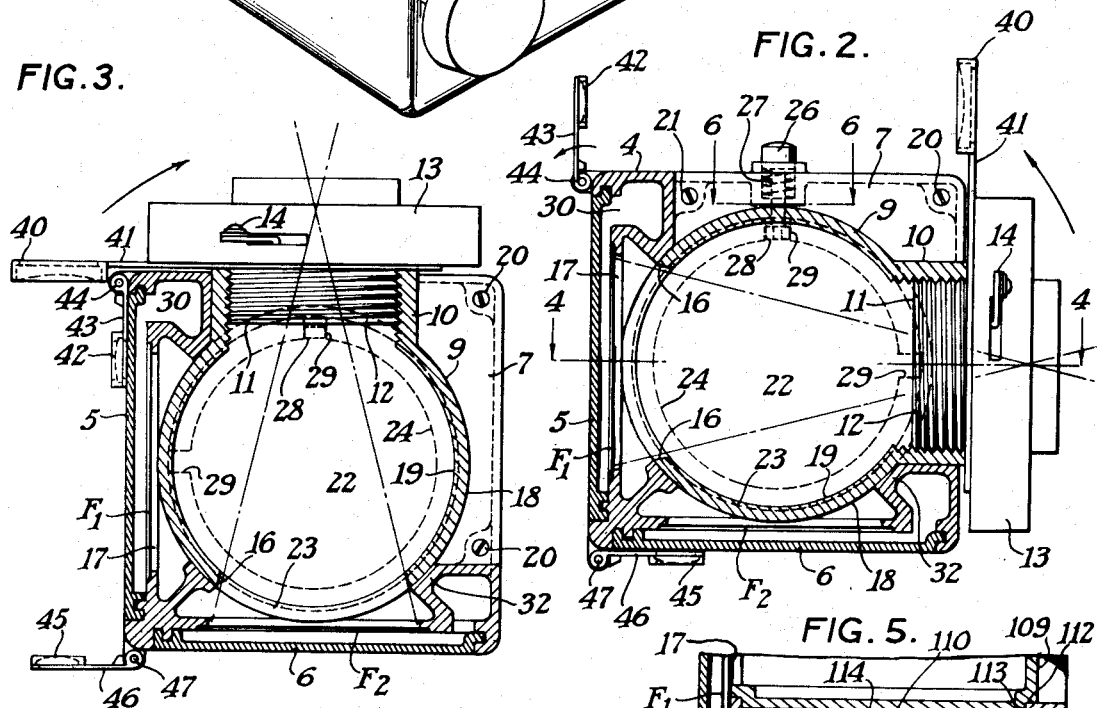
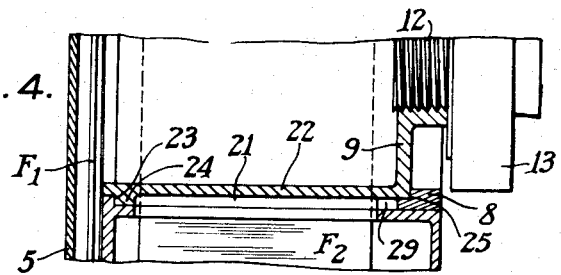
DONALD H. STEWART
INVENTOR
BY *Newton M. Perrin*
ATTORNEYS Patented Sept. 11, 1945

2,384,655

UNITED STATES PATENT OFFICE 2,384,655

TWO-FILM CAMERA

Donald H. Stewart, Rochester, N. Y., assignor to Eastman Kodak Company, Rochester, N. Y., a corporation of New Jersey Application January 26, 1944, Serial No. 519,757

13 Claims. (Cl. 95—31)

This invention relates to photography and more particularly to photographic roll film cameras. One object of my invention is to provide a camera of the type in which two rolls of film may be loaded, each being drawn past an exposure aperture so that either of the two films may be exposed by an objective which is adjustably mounted on the camera body. Another object of my invention is to provide a camera with a moveably mounted objective carried by a moveable part on which the objective may swing between either of two specific positions, and in addition, to provide a means on the carrier for the objective for automatically masking off light from the film which is not to be used. A still further object of my invention is to provide a camera carrying two films angularly disposed with respect to each other, with an objective which can be rapidly and easily swung from a position to expose one of the films to a position to expose the other of the films. A still further object of my invention is to provide a camera of the class described with a view finding system so arranged that two finder elements cooperate to produce a complete finder in either of the two operative positions of the objective. Other objects will appear from the following specification, the novel features being particularly pointed out in the claims at the end thereof.

It has been desirable to provide a camera in which two films can be mounted so that one or the other of the films could be exposed as desired. This is particularly useful in cases where an operator may desire to use either the so-called "black-and-white" film or "color" film. While such cameras have been proposed, they are ordinarily rather bulky and somewhat inconvenient to use. In accordance with my invention, I have endeavored to overcome these difficulties by providing an extremely simple form of adjustable objective which can be rapidly and easily swung from a position in which it will expose one film to a position in which it will expose the other film, and which will at the same time, automatically mask off the unused film.

Coming now to the drawing wherein like reference characters denote like parts throughout:

Fig. 1 is a perspective view of a camera constructed in accordance with and embodying a preferred form of my invention;

Fig. 2 is a transverse section taken through the camera shown in Fig. 1 on a plane passing through the camera objective, the shutter being shown in elevation;

Fig. 3 is a view similar to Fig. 2, but with the parts shown in a position to expose the opposite film from that positioned for exposure in Fig. 2;

Fig. 4 is a fragmentary detail transverse section illustrating the connection between the swinging lens carrier and the camera body. This figure illustrates the form of the invention shown in the preceding figures;

Fig. 5 is a view similar to Fig. 4 but showing a modified form of my invention, and;

Fig. 6 is a fragmentary detail partially in section, illustrating a portion of a preferred form of latch mechanism and taken on line 6—6 of Fig. 2.

My invention, generally, may be said to comprise a camera body in which two roll films are mounted so as to pass by two exposure frames angularly positioned with respect to each other. The camera may include a generally cylindrical type of lens mount, an objective being carried by one side of the cylindrical lens mount, and an aperture through which light rays pass to an exposure frame being carried on the opposite side of the cylinder. This cylinder is mounted to turn through the angle by which the exposure frames are separated so that by releasing a latch, the objective may be positioned for exposing film lying in either of the two exposure frames. This operation of moving the objective from one position to the other also moves a finder element into a position in which it will cooperate with a second finder element carried by the camera body to indicate the field of view.

More specifically, my invention may include a camera body designated generally as 1. This camera body may include end walls 2, a front wall 3, a top wall 4, a rear wall 5, and a bottom wall 6. The front and top walls 3 and 4 include a cut-away portion so that there are a pair of parallel facing walls 7 and 8 between which a cylindrical lens carrier 9 is mounted, this carrier being mounted to turn between the walls 7 and 8, and including a tubular extension 10 having an interior thread 11 to receive the threaded shutter tube 12, carried by a shutter casing 13. The shutter 13 may be of any standard type and may include a trigger 14 for operating the shutter mechanism. The objective may be carried by the shutter in the usual manner, only one element of which 15 is shown.

The cylindrical objective carrier 9 is mounted between the parallel walls 7 and 8 so that it may swing from the position shown in Fig. 2 to the position shown in Fig. 3 or, of course, in a reverse direction so that a film, F—1 or a film, F—2, may be exposed.

In the preferred embodiment of my invention, the cylindrical member 9 carries an opening formed by the walls 16, which is coaxially arranged with the objective 15. As indicated in Figs. 2 and 3, the opening formed by the walls 16 is of a size to permit light rays from the objective to strike the film, F—1 or F—2, lying in the exposure frames 17 and 18, when the lens is properly positioned for exposing the particular frame. It should be noticed that when the film, F—1, for example, is in position for exposure, as in Fig. 2, the film, F—2, is completely masked off by means of the wall 19 of the cylindrical member.

The cylindrical member, as above explained, lies between the parallel walls 7 and 8, and in the preferred embodiment, these walls are plates which may be attached to the camera body by means of screws 20. This facilitates assembling the cylindrical member 9 since these generally V-shaped walls may be assembled after the cylindrical member 9 has been placed so that an outwardly extending flange 21 on the ends 22 of the cylindrical member may engage the recess 23 on the camera body and the recess 24 and groove 25 formed by the camera body and the parallel walls 7 and 8. The walls 7 and 8 not only hold the cylindrical member in place but in addition they form a part of the light-tight circular bearing on which the cylindrical member 9 may turn.

If desired, the parallel walls 7 and 8 may extend completely across the ends of the cylinder, this modification being shown in Fig. 5. In this figure, the cylindrical member 109 is mounted on trunnions 110 which extend into bearings 111 and there are completing grooves 112 extending around the periphery of the ends of the cylinder 109, which form light-tight connection with corresponding flanges 113 on the walls 107 and 108, only one of which is shown in Fig. 5. In order to hold the cylindrical member 109 in a set position, the trunnion 110 is provided with a notch 114 which may be engaged by a lug 115 carried by the formed plate 116 extending outwardly through a slot 117 and terminating in a handle 118 on the outside of the camera.

By depressing this handle, thus moving the plate 116 against the pressure of a spring 119, the cylinder may be released for its swinging movement. At the end of such movement, the lug 115 will drop into a notch 114, thus holding the cylindrical member 109 in its set position.

In the preferred form of my invention as shown in Fig. 2, the cylindrical member 9 may be latched by means of the following structure: There is a push button 26 carried by the camera, this push button being carried on the end of a plunger 27 carrying a turned over lug 28, as shown in Fig. 6. This lug may engage a notch 29 in the flange 24 of the cylindrical member 9. There are two notches 29 which are spaced through an angular distance equal to the angular spacing of the films, F—1 and F—2. Therefore, when it is desired to move the cylindrical member 9 from its Fig. 2 to its Fig. 3 position, the push button 26 is pressed downwardly to release the lug 28 from the notch 29, and it will then run on the periphery of the flange until the lug 28 may drop into the second notch 29, at which time the objective will have reached its Fig. 3 position in which the film, F—2, may be exposed.

It should be noticed that the camera body 1 is provided with an internal construction in which there are three body portions contacting with the periphery of the cylinder 9, namely the walls 30, 31 and 32. These walls form a light-tight seal between the periphery of the cylinder and the camera body so that light cannot pass from the exposure frame beneath which one film is being exposed, to the exposure frame beneath which the opposite film may be exposed. While, of course, the opening in the cylinder formed by the walls 16 must swing across the wall 31 in moving from a position to expose the film, F—1, to a position to expose the film, F—2, or vice versa, this can do no harm because the shutter 13 will only pass light when the trigger 14 is being depressed.

The roll holding construction of the camera body 1 may be of any desired type in which the films, F—1 and F—2, are angularly arranged with respect to each other, preferably through an angle of 90°. The arrangement of the film spools is not important to the present invention and may be the same as that shown in application, Serial No. 487,228, filed May 17, 1943 for roll holding cameras, in the name of McDonald, Jr. and Emde.

It is desirable that the finder system should only be operative for the particular film to be exposed. It is obviously undesirable to have a finder which would produce an image for the film, F—1, if the film, F—2, is the film to be exposed. In order to insure that a finder will be properly positioned, I provide a finder of the type employing two elements 40 and 41, element 40 being preferably carried by a bracket 41' attached to the shutter 13 so as to move when the cylindrical member 9 is moved. As indicated in Fig. 2, the second finder element in this particular position of the camera parts, may be the eye piece 42 carried by the bracket 43, hingedly attached at 44 to the camera body 1 and positioned axially of the finder element 40 when in an operative position, and moveable in the direction shown by the arrow in Fig. 2, into a position in which it may lie flat against the wall 5 of the camera when not in use.

When the cylindrical member 9 is swung from its Fig. 2 position to its Fig. 3 position, the finder element 42 is folded flat against the wall 5, and in this position the second finder element may consist of an eye piece 45 mounted on a bracket 46 hinged at 47 to the camera body. This eye piece is exactly the same as the eye piece 42 except for its location on the camera body, and it may be swung about its hinge 47 into the inoperative position in which it lies against the wall 6 as indicated in Fig. 2.

It will be noticed that it will be impossible for an operator to forget to adjust the finder when the position of the cylindrical member 9 is changed to expose a different film. This is because the cylindrical member 9 swings the first finder element 40 with it, and since the view finder only registers the proper view when the proper eye piece 42 or 45 is used, the finder will always be suited to the particular film being exposed.

The operation of my improved camera is extremely simple in that one of the films may be exposed with the camera lens or objective 15 in one position, and any time the operator desires to expose the opposite film, it is only necessary to depress the release button 26 and to swing the cylindrical lens carrier 9 to its opposite position, to place the objective in optical alignment with the opposite film. The operator, of course, must swing up one eye piece 42 or 45 and swing the opposite eye piece flat against the camera body to properly position the finder for use, but this operation will not be forgotten because unless the eye pieces are properly positioned, the operator will be unable to look at the view to be photographed through the two-piece finder.

In the specification and claims where I have referred to parallel walls, I mean either the comparatively small, generally V-shape walls 7 or 8, which are separate from the remaining portion of the walls, including the grooves 23 or the walls 107 and 108 which may be formed in one piece and which extend completely across the ends of the cylindrical lens carrier 109. In both cases the function is the same in that the cylindrical member is rotatably mounted between the parallel walls, being carried by these walls, and this makes it possible for the objective to be mounted with the required degree of accuracy with respect to the exposure frames 17 and 18. Unless the tolerances are held very close in the relative locations of the two exposure frames and the objective carrier, first class results cannot be obtained.

While I have described a preferred embodiment of my invention, it is obvious that modifications can readily be made, and I consider as within the scope of my application, all such modifications as may come within the scope of the appended claims.

What I claim is:

1. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, means for moveably mounting the cylinder on the camera body to turn thereon for positioning the objective so that the lens axis passes through said window and either of the two exposure frames, said cylinder masking the opposite exposure frame from light from the objective.

2. In a photographic camera of the type including a camera body, two exposure frames carried by the camera body, one arranged at right angles to the other, the combination with said exposure frames, of an objective, a hollow cylindrical carrier positioned partially within said body for supporting the objective on one side of the cylinder and including a window on the opposite side of the cylinder, means for moveably mounting the cylinder within the camera body to turn therein at a right angle for positioning the objective so that the lens axis passes through said window and either of the two exposure frames, said cylinder masking the opposite exposure frame from light from the objective, and a latch for holding the cylinder in either of its two operative positions.

3. In a photographic camera of the type including a camera body, two exposure frames carried by the camera body, independent film strips positioned over said frames for exposure said frames being angularly arranged, the combination with said exposure frames, of an objective, a cylindrical carrier for the objective supporting the objective on one side of the cylinder and including a window on the opposite side of the cylinder, means for moveably mounting the cylinder on the camera body to turn thereon for selectively positioning the objective so that the lens axis passes through said window and either of the two exposure frames to expose only one of said films, said cylinder masking the other exposure frame from light from the objective, and a substantially light tight connection between the camera, cylinder and exposure frames.

4. In a photographic camera of the type including a camera body, two exposure frames carried by the camera body, one arranged at a right angle to the other, the combination with said exposure frames, of an objective, a hollow cylindrical carrier supporting the objective on one side and provided with a window on the other side in optical alignment with the objective, means for moveably mounting the cylinder within the camera body to turn thereon for positioning the objective so that the lens axis passes through said window and either of the two exposure frames, said cylinder having a curved wall for masking the opposite exposure frame from light from the objective, a pair of notches in the cylinder spaced by the angular relationship of the exposure frames, and a moveable detent for engaging said notches to hold said cylinder in either of its two positions.

5. In a photographic camera of the type including a camera body, two exposure frames positioned at substantially right angles to each other, the combination with said exposure frames, of inner camera walls extending at right angles to the exposure frames, a cylinder mounted between said walls to turn through substantially right angles on an axis parallel to the planes of the exposure frames, an objective carried by said cylinder on one side thereof and a window in an opposite wall of the cylinder, and means forming a light tight joint between the inner camera walls, the cylinder and the exposure frame, whereby light may pass through said objective to only one of said exposure frames.

6. In a photographic camera of the type including a camera body, two exposure frames positioned at substantially right angles to each other, the combination with said exposure frames, of inner camera walls extending at right angles to the exposure frames, a cylinder mounted between said walls to turn through substantially right angles on an axis parallel to the planes of the exposure frames, an objective carried by said cylinder on one side thereof and a window in an opposite wall of the cylinder, means forming a light tight joint between the inner camera walls, the cylinder and the exposure frame, whereby light may pass through said objective to only one of said exposure frames, spool chambers on each end of the camera body between the pair of spaced inner camera walls and end walls of the camera spaced from the inner walls a distance to enclose two spool chambers positioned at right angles to each other.

7. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, means for moveably mounting the cylinder on the camera body comprising a pair of spaced walls on the camera body at the ends of the cylinder and trunnions between the spaced walls and cylinder on which the latter may turn with respect to the walls to expose film carried in the exposure frames.

8. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, means for moveably mounting the cylinder on the camera body comprising a pair of spaced walls on the camera body at the ends of the cylinder, trunnions supporting the cylinder on the spaced walls, and means for preventing light from entering between the spaced walls, cylinder and exposure frames.

9. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, said camera body including inner spaced walls parallel to the axis of the objective for turnably supporting the cylinder, said camera body also including top and side walls reduced in width and terminating in said inner spaced walls and adjacent said cylinder and means forming a light tight connection therebetween.

10. In a photographic camera, the combination with a camera body, of two sets of film spool supporting mechanisms, a pair of exposure frames mounted in different planes, a pair of trunnions having a common axis parallel with the planes of the pair of exposure frames and equidistant from lines drawn longitudinally through the center thereof, a cylindrical lens carrier having a window opposite an objective carried thereby, means for supporting the cylinder from said camera body on said trunnions whereby said lens may be swung selectively thereon to a position in axial alignment with either of the two exposure frames.

11. In a photographic camera, the combination with a camera body, of two sets of film spool supporting mechanisms at right angles, a pair of exposure frames mounted in different planes, a pair of trunnions having a common axis parallel with the planes of the pair of exposure frames and equidistant from lines drawn longitudinally through the center thereof, a cylindrical lens carrier partially positioned within said body and having a window opposite an objective carried thereby, means for supporting the cylinder from said camera body on said trunnions whereby said lens may be swung thereon to a position in axial alignment with either of the two exposure frames, and means for holding the cylindrical lens carrier in a position axially aligned with respect to an exposure frame including a latch carried by the camera body, a pair of notches moveable with the cylinder and spaced angularly by a spacing corresponding to the angular spacing of the exposure frames whereby said latch may engage a notch to latch said cylinder against turning.

12. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, means for moveably mounting the cylinder on the camera body to turn thereon for positioning the objective so that the lens axis passes through said window and either of the two exposure frames, said cylinder masking the opposite exposure frame from light from the objective, a view finder including one element carried by the cylinder, and two finder elements carried by the camera body positioned so that one of the two finder elements may be axially aligned with the view finder element carried by the cylinder to indicate the field of view.

13. In a photographic camera of the type including a camera body, two exposure frames carried by the camera body, one arranged at an angle to the other, the combination with said exposure frames, of an objective, a cylindrical carrier for the objective supporting the objective on one side of the cylinder and including a window on the opposite side of the cylinder, means for moveably mounting the cylinder on the camera body to turn thereon for positioning the objective so that the lens axis passes through said window and either of the two exposure frames, said cylinder masking the opposite exposure frame from light from the objective, a view finder element fixedly carried by the cylinder, a pair of eye pieces moveably attached to the camera body and angularly spaced thereon in accordance with the angular spacing if the exposure frames, and moveable to and from positions in which they may cooperate with the fixedly mounted finder element to indicate the field of view.

DONALD H. STEWART.